(12) United States Patent
Gerczak

(10) Patent No.: US 9,873,382 B1
(45) Date of Patent: Jan. 23, 2018

(54) CONSOLE ASSEMBLIES HAVING SUPPORT STRUCTURES WITH SIDE IMPACT REINFORCEMENTS

(71) Applicant: Toyota Motor Engineering & Manufacturing North America, Inc., Erlanger, KY (US)

(72) Inventor: Mitch J. Gerczak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/200,821

(22) Filed: Jul. 1, 2016

(51) Int. Cl.
*B60R 7/00* (2006.01)
*B60R 7/04* (2006.01)

(52) U.S. Cl.
CPC ....................... *B60R 7/04* (2013.01)

(58) Field of Classification Search
CPC .......................................................... B60R 7/04
USPC ............................... 296/37.8, 24.34, 187.12
See application file for complete search history.

(56) References Cited

U.S. PATENT DOCUMENTS

| 7,185,937 B2 | 3/2007 | Sakakibara |
| 2010/0244489 A1 | 9/2010 | Shiono et al. |
| 2014/0049063 A1* | 2/2014 | Yamaguchi ............... B60R 7/04 296/24.34 |

FOREIGN PATENT DOCUMENTS

DE 196 15 320 C1 5/1997

\* cited by examiner

*Primary Examiner* — Joseph D Pape
(74) *Attorney, Agent, or Firm* — Dinsmore & Shohl LLP

(57) ABSTRACT

A support structure that supports a console housing of a console assembly is provided. The support structure is secured to a floor of a vehicle. The support structure includes a pair of side walls and a platform wall. Each side wall has an upper edge, an opposite lower edge, an interior surface, and an opposite exterior surface. The platform wall traverses the interior surfaces of the pair of side walls between the upper edge and the lower edge of each of the pair of side walls. The console housing is mounted to the platform wall between and below the upper edges of the pair of side walls.

20 Claims, 6 Drawing Sheets

“Forward” is defined as the positive Z direction of the

CONSOLE ASSEMBLIES HAVING SUPPORT STRUCTURES WITH SIDE IMPACT REINFORCEMENTS

TECHNICAL FIELD

The present specification generally relates to console assemblies and, more specifically, to console assemblies having support structures with side impact reinforcement features.

BACKGROUND

Console assemblies for vehicles are known to include side impact reinforcements. The console assemblies are provided with a support structure to reinforce against a load from a side impact that is transmitted through a seat to the console assembly.

In order to provide side impact reinforcement, the support structure is aligned with a structural component of the seat that transmits the load from the side impact. However, due to modern seat assemblies being adjustable in a vertical direction, the support structure is required to align with the structural component of the vehicle seat at various positions in the vertical direction. The increases in the vertical position of the structural component increase the required height of the support structure and consequently the overall height of the console assembly. The overall height of the console assembly is typically limited to provide an aesthetically pleasing appearance. Therefore, a volume in the vertical direction of a storage compartment of the console assembly is decreased to accommodate the increase in the required height of the support structure without increasing the overall height of the console assembly.

Accordingly, there is a need for a console assembly having a support structure capable of providing side impact reinforcement without increasing the overall height of the console assembly or decreasing the volume, in the vertical direction, of the storage compartment.

SUMMARY

In accordance with one embodiment, a support structure is provided. The support structure supports a console assembly having a console housing. The support structure is secured to a floor of a vehicle. The support structure includes a pair of side walls and a platform wall. Each of the pair of side walls having an upper edge, an opposite lower edge, an interior surface, and an opposite exterior surface. The platform wall traverses the interior surfaces of the pair of side walls between the upper edge and the lower edge of each of the pair of side walls. The console housing is mounted to the platform wall between the pair of side walls at a position below the upper edges of the pair of side walls.

In another embodiment, a vehicle console assembly is provided. The console assembly is provided on a floor of a vehicle. The console assembly includes a console housing and a support structure. The console housing defines an interior storage cavity. The support structure includes a pair of side walls and a platform wall. Each of the pair of side walls having an upper edge, an opposite lower edge, an interior surface, and an opposite exterior surface. The platform wall traversing the interior surfaces of the pair of side walls between the upper edge and the lower edge of each of the pair of side walls. The console housing mounted to the platform wall between the pair of side walls at a position below the upper edges of the pair of side walls.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 5:
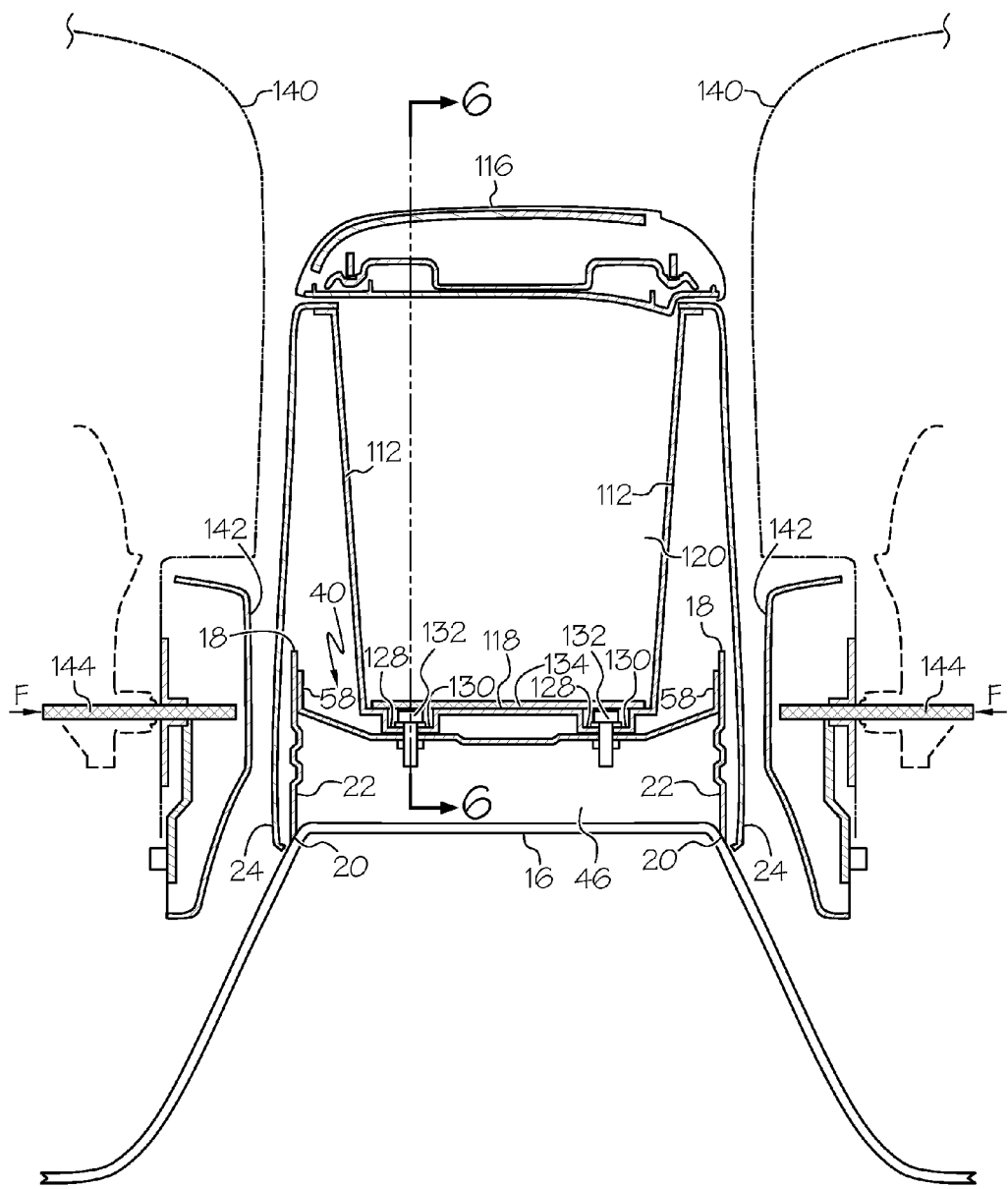
FIG. 5 is a partial cross-sectional view of the console assembly taken along the line of 5-5 of FIG. 4, according to one or more embodiments shown and described herein.

FIG. 5 generally depicts a cross section of a console assembly provided on a floor of a vehicle. The console assembly includes a console housing and a support structure. The console housing defines an interior storage cavity. The support structure includes a pair of side walls and a platform wall. Each side wall has an upper edge, an opposite lower edge, an interior surface, and an opposite exterior surface. The platform wall extends between the interior surfaces of the pair of side walls, between the upper edge and the lower edge of each side wall. The console housing mounts to the platform wall between the pair of side walls at a position below the upper edges of the pair of side walls. The various components of console assemblies and methods for assembling console assemblies will be described in more detail herein with specific reference to the corresponding drawings.

Coordinate axes are included in the drawings in order to provide a frame of reference for various components of the console assemblies. As used herein, "upper" is defined as the positive Y direction of the coordinate axis shown in the drawings. "Lower" is defined as the negative Y direction of the coordinate axis shown in the drawings. "Interior" is defined as the positive X direction of the coordinate axis shown in the drawings. "Exterior" is defined as the negative X direction of the coordinate axis shown in the drawings. "Forward" is defined as the positive Z direction of the coordinate axis shown in the drawings. "Rearward" is defined as the negative Z direction of the coordinate axis shown in the drawings. It is appreciated, of course, that the Y direction of the coordinate axis shown in the drawings corresponds to the vehicle up and down direction. The X direction of the coordinate axis shown in the drawings corresponds to the vehicle width direction. The Z direction of the coordinate axis shown in the drawings corresponds to the vehicle longitudinal direction.

Console assemblies may be provided at any suitable position within a vehicle, such as between a pair of front row seats, a pair of second or third row rear seats, etc. The console assemblies may be provided with an interior cavity utilized as a storage compartment. The console assembly is typically provided on a central tunnel of a floor of a vehicle. The central tunnel is formed to accommodate a transmission or driveshaft of the vehicle. While the embodiments described herein are described in reference to a console assembly having an interior cavity used as a storage compartment, the embodiments are not limited thereto. For example, in some embodiments, the console assembly may be provided with alternative vehicle accessories such as receptacles (e.g., a cup holder), ashtrays, electronic components, HVAC, and/or audio component controls, etc. In some embodiments, the console housing is fixedly secured to the support structure. However, the embodiments are not limited thereto. For example, in some embodiments, the console may be releasably attached for movement between support structures positioned between pairs of first row seats, second row seats, and third row seats of a vehicle.

Figure 1:
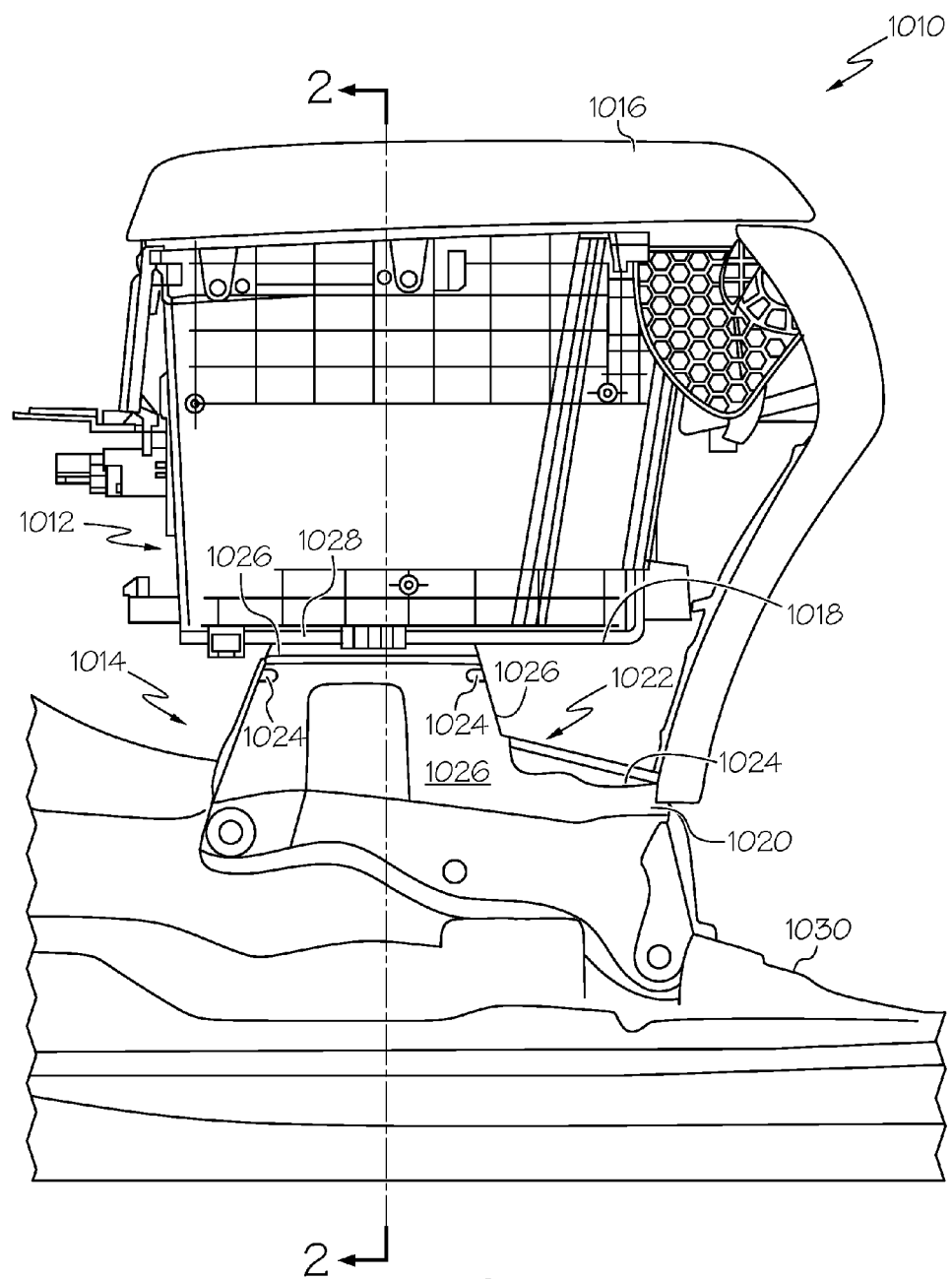
FIG. 1 (prior art) schematically depicts a partial side view of a conventional console assembly.

Referring now to FIG. 1 (prior art), a partial cross section of a console assembly 1010 having a console housing 1012 and a conventional support structure 1014 is schematically depicted. The console housing 1012 has a lid 1016 and a lower wall 1018. The conventional support structure 1014 includes side walls 1020 having a tiered upper wall 1022 secured at an upper edge of the side walls 1020. The tiered upper wall 1022 includes a plurality of tabs 1024 that extend over an upper edge 1026 of the side walls 1020. The plurality of tabs 1024 are secured to an exterior of the side walls 1020. As the plurality of tabs 1024 extend over the upper edge 1026 of the side walls 1020, the tiered upper wall 1022 is positioned above the upper edge 1026 of the side walls 1020.

Figure 2:
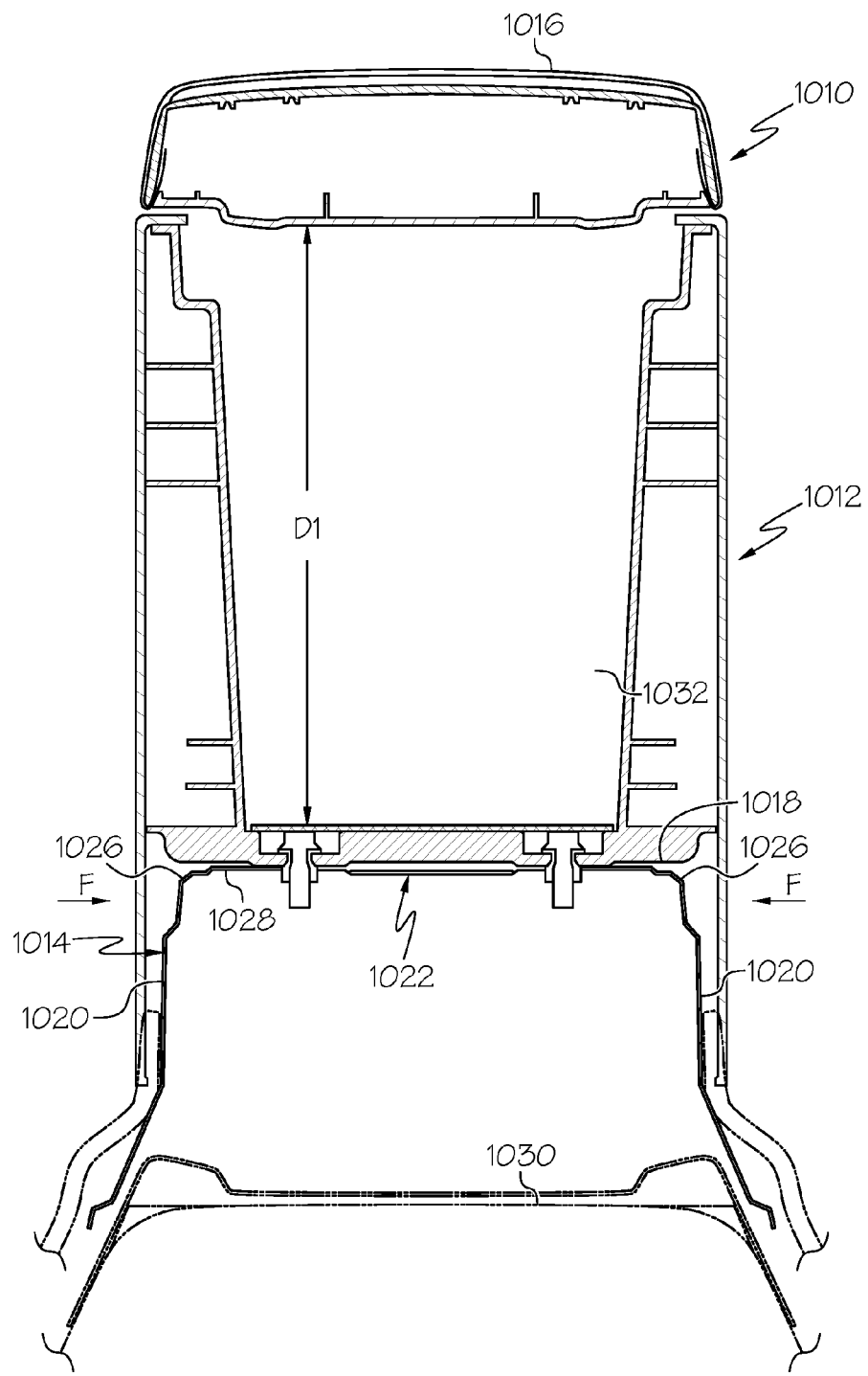
FIG. 2 (prior art) schematically depicts a partial cross-sectional view of a conventional console assembly taken along the line 2-2 of FIG. 1.

Referring now to FIG. 2 (prior art), a partial cross section of the console assembly 1010 having the conventional support structure 1014 is schematically depicted. The lower wall 1018 of the console housing 1012 is secured to an upper wall portion 1028 of the tiered upper wall 1022 by fasteners. As the upper wall portion 1028 is provided at a position above the upper edges 1026 of the side walls 1020, the console housing 1012 is provided above the side walls 1020. Specifically, the console housing 1012 is positioned above the upper edges 1026 of the pair of side walls 1020.

Still referring to FIG. 2, the conventional support structure 1014 is provided to reinforce against a load F from a side collision transmitted by a support structure of a vehicle seat. The side walls 1020 are configured to have a height from the floor 1030 greater than the height of the load F from the floor 1030. Due to such a configuration, the overall height of the console assembly 1010 from the floor 1030 is increased in order to maintain a distance D1 of an interior cavity 1032 of the console housing 1012. Alternatively, the distance D1 of the interior cavity 1032 of the console housing 1012 is decreased to limit an increase in the overall height of the console assembly 1010.

The above described configuration may result in a console assembly 1010 utilizing a conventional support structure 1014 having an overall height that lacks an aesthetically pleasing appearance for an interior of the vehicle. The configuration may also provide an uncomfortable arrangement for a driver to utilize the lid 1016 as an armrest due to the overall height of the console assembly 1010. The configuration may further require a decrease in the distance D1 of the interior cavity 1032 of the console housing 1012. The decrease in the distance D1 of the interior cavity 1032 provides an inconveniently sized storage compartment for items that occupants are accustomed to storing therein. The embodiments described herein are directed to console assemblies comprising support structures that mitigate the increase in overall height of the console assembly or the decrease in available storage space of the console housing.

Figure 3:
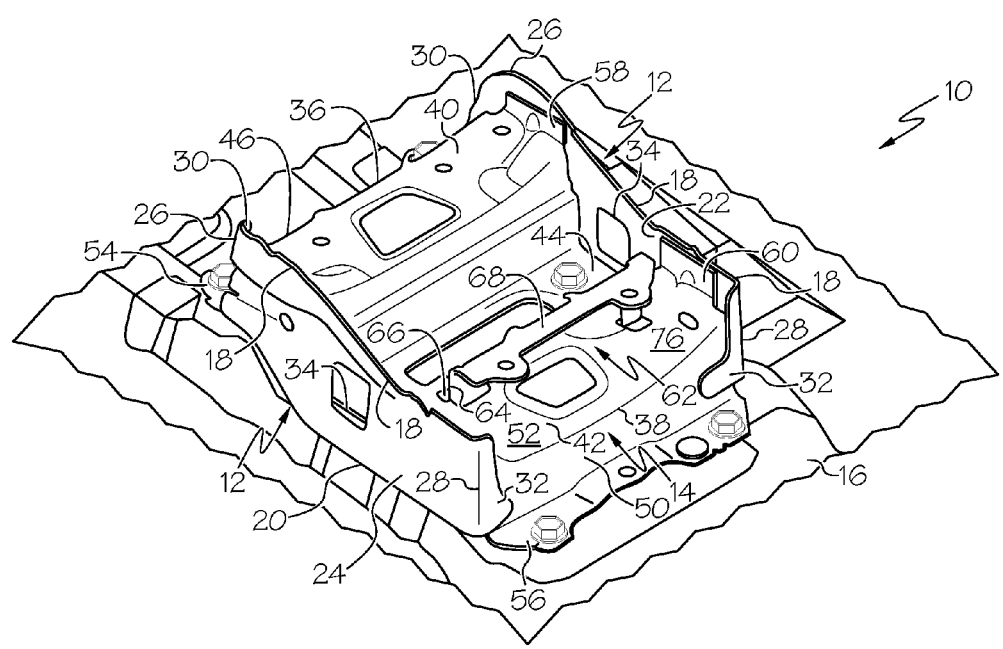
FIG. 3 schematically depicts a perspective view of a support structure installed on a central tunnel of a floor of a vehicle, according to one or more embodiments shown and described herein.

Referring now to FIG. 3, a perspective view of a support structure 10 is depicted. The support structure 10 includes a pair of side walls 12 and a platform wall 14. The support structure 10 is secured to a floor 16 which will be described in greater detail below. The floor 16 is formed with a central tunnel upon which the support structure 10 straddles. Specifically, one of the pair of side walls 12 is provided on one side of the central tunnel and the other of the pair of side walls 12 is provided on the other side of the central tunnel.

Still referring to FIG. 3, the pair of side walls 12 includes an upper edge 18 and an opposite lower edge 20. The lower edge 20 is positioned adjacent the floor 16 and the upper edge 18 is positioned farther away from the floor 16 than the lower edge 20. The pair of side walls 12 include interior surfaces 22 and opposite exterior surfaces 24. The pair of side walls 12 include a front edge 26 and an opposite rear edge 28. Each side wall 12 includes front projections 30 that project inwardly from the front edge 26 of the interior surface 22 and rear projections 32 that project inwardly from the rear edge 28 of the interior surface 22. Each side wall 12 includes apertures 34. The apertures 34 extend between the interior surface 22 and the exterior surface 24. The apertures 34 are provided between the front edge 26 and the rear edge 28. The apertures 34 provide a weight reduction in the pair of side walls 12 and are positioned so as to not interfere with the side reinforcement ability of the support structure 10.

Still referring to FIG. 3, the platform wall 14 is configured in a tiered shape having a first platform portion 40, a second platform portion 42, and a third platform portion 44. The first platform portion 40 is provided so as to form the front edge 26 and the second platform portion 42 is provided so as to form the rear edge 38. The third platform portion 44 is provided between the first platform portion 40 and the second platform portion 42. The third platform portion 44 is positioned below the first platform portion 40 and the second platform portion 42. Specifically, the third platform portion 44 is positioned closer to the lower edges 20 of the pair of side walls 12 than the first platform portion 40 and the second platform portion 42.

As the pair of side walls 12 are formed to contour to the floor 16 of the vehicle, the upper edges 18 of the pair of side walls 12 adjacent the first platform portion 40 are provided with a height greater than a height of the upper edges 18 of the pair of side walls 12 adjacent the second platform portion 42.

Still referring to FIG. 3, the platform wall 14 includes a front wall 46 that extends from the front edge 26 of the first platform towards the floor 16. The front wall 46 is provided adjacent the front edge 26 of the pair of side walls 12 such that the exterior surface 48 of the front wall 46 contacts the interior surface 22 of the front projection 36. The platform wall 14 includes a rear wall 50 that extends from the rear edge 28 of the second platform portion 42 towards the floor 16. The rear wall 50 is provided adjacent the rear edge 28 of the pair of side walls 12 such that an exterior surface 52 of the rear wall 50 contacts the interior surface 22 of the rear projection. The engagement of front wall 46 with the front projections 30 and the rear wall 50 with the rear projections 32 provides a structural reinforcement to the support structure 10. The front wall 46, the first intermediate wall 44a, the second intermediate wall 44b, and the rear wall 50 extend between the interior surfaces 22 of the pair of side walls 12.

As described above, the platform wall 14 extends between the interior surfaces 22 of the pair of side walls 12. Specifically, the first platform portion 40, the second platform portion 42, and the third platform portion 44 extend between the interior surfaces 22 of the pair of side walls 12 between the upper edge 18 and the lower edge 20. The front wall 46 is provided with a front flange 54 extending outwardly from the exterior surface 48. The front flange 54 is positioned so as to extend beyond the front projections 30 below the lower edge 20 of the pair of side walls 12. The rear wall 50 is provided with a rear flange 56 that extends outwardly from the exterior surface 52. The rear flange 56 extends beyond the rear projections 32 positioned below the lower edge 20 of the pair of side walls 12. As will be described in greater below, the front flange 54, the third platform portion 44, and the rear flange 56 secure the support structure 10 to the floor 16 of the vehicle.

The first platform portion 40 includes a pair of first tabs 58 that extend upwardly at either side of the first platform portion 40. The second platform portion 42 includes a pair of second tabs 60 that extend upwardly at either side of the second platform portion 42. Each of the pair of first tabs 58 and each of the pair of second tabs 60 are fixedly secured to the respective interior surfaces 22 of each of the pair of side walls 12. Specifically, one of the pair of first tabs 58 and one of the pair of second tabs 60 are secured to the interior surface 22 of one of the pair of side walls 12 and the other of the pair of first tabs 58 and the other of the pair of second tabs 60 are secured to the interior surface 22 of the other of the pair of side walls 12. The pair of first tabs 58 and the pair of second tabs 60 are secured to the interior surface 22 of the pair of side walls 12 such that the platform wall 14 does not move with respect to the pair of side walls 12. The pair of first tabs 58 and the pair of second tabs 60 are secured to the pair of side walls 12 by welding, vibrational welding, riveting, adhesive, fasteners, etc.

The second platform portion 42 includes a deformable bracket 62. The deformable bracket 62 includes a vertical leg 64. A platform arm 66 extends generally normal from a lower end of the leg 64. A console arm 68 extends outwardly from an upper end of the leg 64 on an opposite side from the platform arm 66. The platform arm 66 is secured to an upper surface 70 of the second platform portion 42. It is appreciated, of course, that the platform wall 14 is formed as a single one piece monolithic structure with the deformable bracket 62.

As will be described in greater detail below, the first platform portion 40 is provided at a height from the floor 16 that is greater than a height from the floor 16 of the second platform portion 42 and the third platform portion 44. The second platform portion 42 is provided at the height from the floor 16 greater than the height from the floor 16 of the third platform portion 44.

Figure 4:
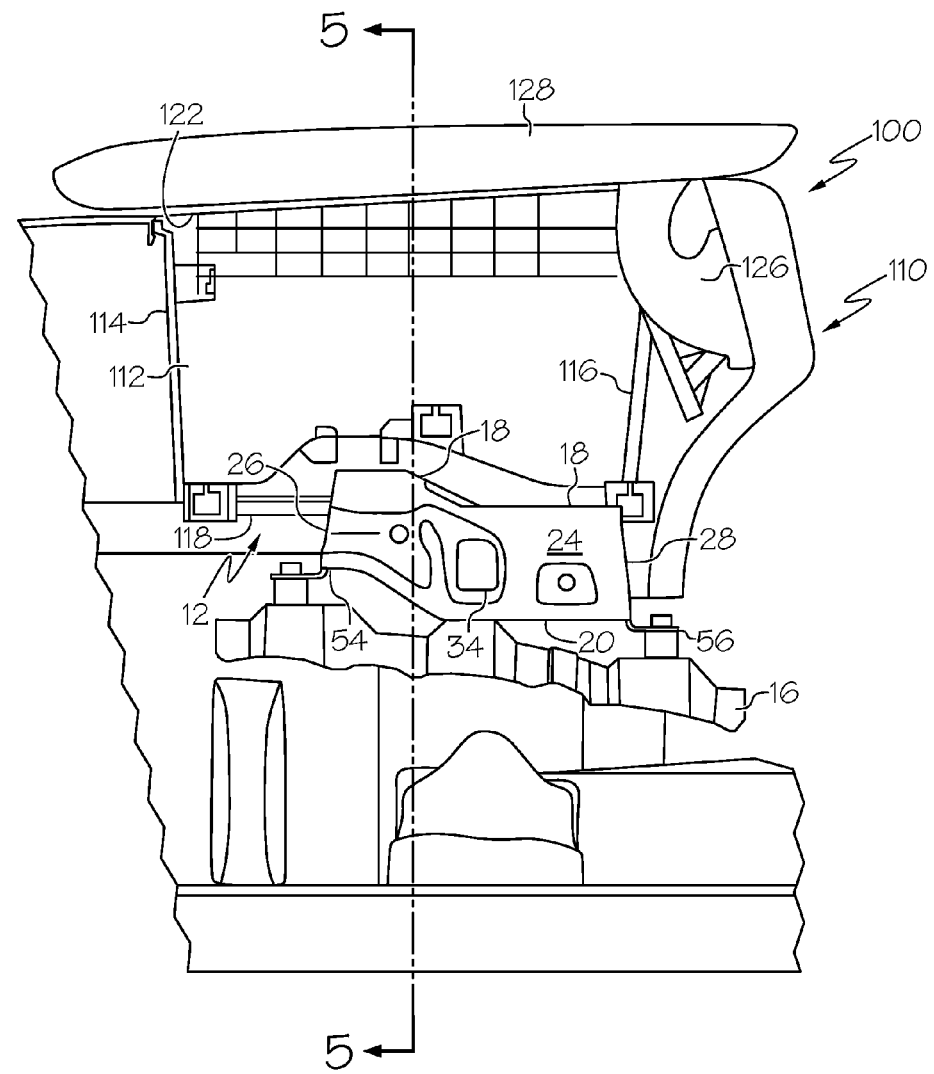
FIG. 4 schematically depicts a partial side view of the console assembly according to one or more embodiments shown and described herein.

Referring now to FIG. 4, a partial side view of the console assembly 100 is schematically depicted. The console assembly 100 includes a console housing 110 having a pair of side walls 112, a front wall 114, a rear wall 116, and a lower wall 118. The side walls 112, front wall 114, rear wall 116, and lower wall 118 define an interior cavity 120 having an open top 122. The interior cavity 120 is utilized as a storage compartment. The open top 122 of the console housing 110 is covered by a console lid 124 connected to the rear wall 116 by a hinge 126.

Referring now to FIG. 5, a partial cross-sectional view of console assembly 100 in which the console housing 110 is attached to the support structure 10 is schematically depicted. The lower wall 118 of the console housing 110 includes depressions 128 having apertures 130. Fasteners 132 extend through the apertures 130 in the depressions 128 of the lower wall 118 and are secured to apertures 72 formed in the first platform portion 40. The console housing 110 includes an intermediate wall 134 that is positioned above the depressions 128 of the lower wall 118.

Still referring to FIG. 5, the console housing 110 is mounted to the support structure 10 such that the lower wall 118 is positioned between the pair of side walls 12. Further, the console housing 110 is mounted to the support structure 10 such that the lower wall 118 is positioned between the upper edge 18 and the lower edge 20 of the pair of side walls 12. Specifically, the lower wall 118 is positioned below the upper edge 18 of the pair of side walls 12 such that a height from the floor 16 to the lower wall 118 is less than a height from the floor 16 to the upper edge 18 of the pair of side walls 12.

Still referring to FIG. 5, the console assembly 100 is positioned between a pair of seats 140. Specifically, the exterior surfaces 24 of the pair of side walls 12 are disposed in opposed relation to interior faces 142 of the seats 140. Each of the seats 140 includes a seat rod 144 about an axis of which a seat back pivots with respect to a seat cushion of the seat 140s. The seat rod 144 acts as a transferring member during a side impact load to transfer a force F to the console assembly 100. By providing the console assembly 100 with a support structure 10 in which a console housing 110 is mounted below upper edges 18 of the pair of side walls 12 allows the support structure 10 to act as a side reinforcement against the load F transferred by the seat rod 144. As the console housing 110 is provided below the upper edges 18 of the support structure 10, the console assembly 100 maintains the structural reinforcement against side impact loads transmitted by the seat rod 144 and accommodates greater vertical volume in the console housing 110, specifically the interior cavity 120, without increasing an overall height of the console assembly 100.

Figure 6:
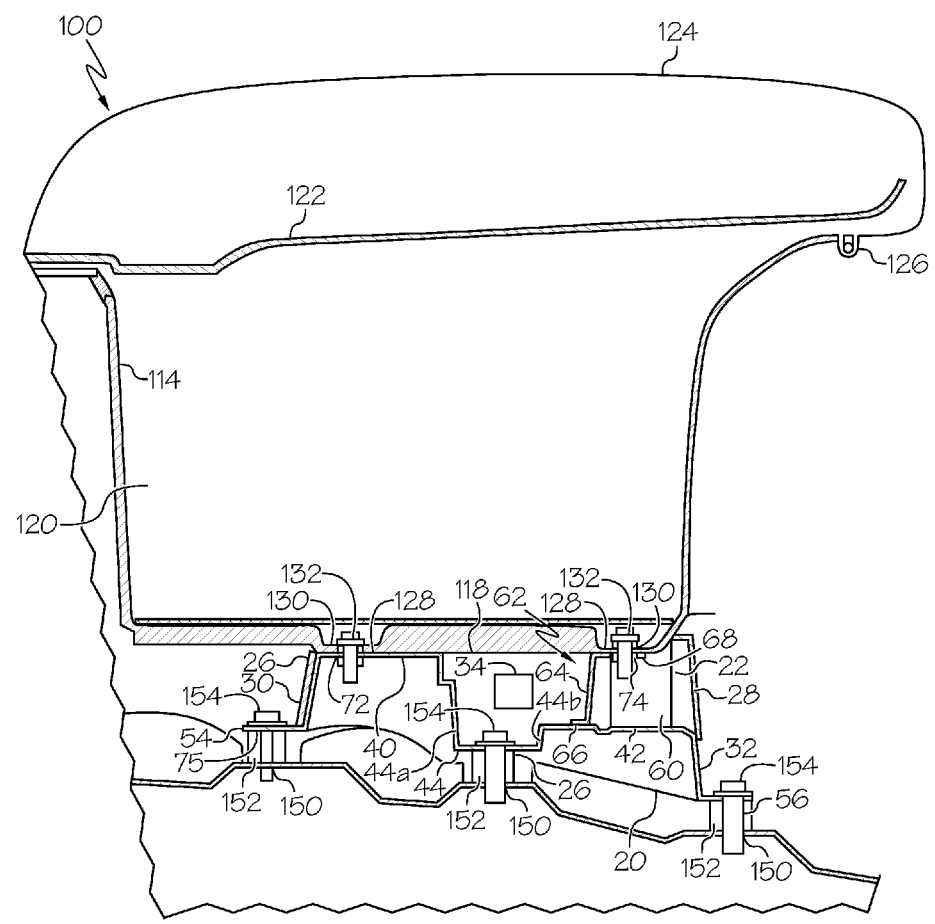
FIG. 6 schematically depicts a partial cross section of a vehicle console assembly taken along the line of 6-6 of FIG. 5.

Referring now to FIG. 6, a partial cross section of the console assembly 100 in which the console housing 110 is secured to the support structure 10 is schematically depicted. A first intermediate wall 44a connects the third platform portion 44 to the first platform portion 40. A second intermediate wall 44b connects the third platform portion 44 to the second platform portion 42.

Still referring to FIG. 6, the lower wall 118 includes depressions 128 having apertures 130. The apertures 130 formed in the depressions 128 correspond to apertures 72 formed in the first platform portion 40 and apertures 74 formed in the console arm 68 of the deformable bracket 62. Fasteners 132 are used to secure the lower wall 118 of the console housing 110 to the support structure 10, specifically, the first platform portion 40 and the second platform portion 42 via the deformable bracket 62.

Still referring to FIG. 6, the deformable bracket 62 is provided so as to deform upon receiving a load greater than a predetermined load. The deformable bracket 62 deforms such that the console housing 110 moves with respect to the support structure 10 during a collision. The deformation of the deformable bracket 62 absorbs a portion of a load transmitted to the console assembly 100 by an occupant during the collision.

Still referring to FIG. 6, the support structure 10 is secured to the floor 16 via the platform wall 14. Specifically, the front flange 54 is provided with front flange apertures 75, the rear flange 56 is provided with rear flange apertures 76, and the third platform portion 44 is provided with third platform apertures 78. The front flange apertures 75, the rear flange apertures 76, and the third platform apertures 78 correspond to floor apertures 150 formed in the floor 16. Spacers 152 are provided between the platform wall 14, specifically, the front flange 54, the third platform portion 44, and the rear flange 56, to space the platform wall 14 a predetermined distance above the floor 16. Floor fasteners 154 extend through the front flange apertures 75, the rear flange apertures 76, the third platform apertures 78, and the spacers 152 and engage in the floor apertures 150 to secure the support structure 10 to the floor 16. In some embodiments, the support structure 10 is secured to the floor 16 without the spacers 152. In some other embodiments, the support structure 10 is secured to the floor 16 by welding, riveting, adhesive, etc.

It is appreciated, of course, that the support structure 10 is formed as separate components. Specifically, each of the pair of side walls 12 and the platform wall 14 is a separate integrally formed one-piece monolithic structure in which the platform wall 14 is secured to the pair of side walls 12 by the pair of first tabs 58 and the pair of second tabs 60. In some embodiments, the pair of side walls 12 and the platform wall 14 is formed integrally as a one-piece monolithic structure. In some embodiments, the deformable bracket 62 is formed as a separate component from the platform wall 14. In some other embodiments, the deformable bracket 62 is formed as a one-piece monolithic structure with the platform wall 14 that is either separate from or formed integrally as a one-piece monolithic structure with the pair of side walls 12.

It should now be understood that the console assembly includes a console housing and a support structure that provide side impact reinforcement while maintaining a volume, in a vertical direction, of an interior cavity of a console housing and without increasing an overall height of the console assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A support structure that supports a console assembly having a console housing, the support structure secured to a floor of a vehicle, the support structure comprising:
   a pair of side walls, each of the pair of side walls having an upper edge, an opposite lower edge, an interior surface and an opposite exterior surface; and
   a platform wall extending between the interior surfaces of the pair of side walls between the upper edge and the lower edge of each of the pair of side walls, the console housing mounted to the platform wall between the pair of side walls at a position below the upper edges of the pair of side walls.

2. The support structure of claim 1, wherein the platform wall includes a first platform portion, a second platform portion, and a third platform portion positioned between the first platform portion and the second platform portion, the third platform portion positioned below the first platform portion and the second platform portion.

3. The support structure of claim 2, wherein a first pair of tabs extend outwardly from the first platform portion, each of the first pair of tabs are fixedly secured to the respective interior surface of each of the pair of side walls.

4. The support structure of claim 2, wherein a second pair of tabs extend outwardly from the second platform portion, each of the second pair of tabs are fixedly secured to the respective interior surface of each of the pair of side walls.

5. The support structure of claim 2, wherein the third platform portion is positioned closer to the lower edge of the pair of side walls than the first platform portion and the second platform portion.

6. The support structure of claim 5, wherein the third platform portion is secured to the floor.

7. The support structure of claim 6, wherein the first platform portion includes a front edge and a front wall that extends from the front edge of the first platform portion towards the lower edge of the pair of side walls.

8. The support structure of claim 7, wherein each of the pair of side walls includes a front projection that extend inwardly from the interior surfaces of the pair of side walls, the front projection of each of the pair of side walls contacts the front wall of the first platform portion.

9. The support structure of claim 6, wherein the second platform portion includes a rear edge opposite the front edge, the second platform portion includes a rear wall that extends from the rear edge of the second platform portion towards the lower edge of the pair of side walls.

10. The support structure of claim 9, wherein each of the pair of side walls includes a rear projection that extend inwardly from the interior surfaces of the pair of side walls, the rear projection of each of the pair of side walls contacts the rear wall of the second platform portion.

11. A console assembly provided on a floor of a vehicle, the console assembly comprising:
    a console housing defining an interior cavity; and
    a support structure having a pair of side walls and a platform wall, each of the pair of side walls having an upper edge, an opposite lower edge, an interior surface and an opposite exterior surface, the platform wall extending between the interior surfaces of the pair of side walls between the upper edge and the lower edge of each of the pair of side walls, the console housing mounted to the platform wall between the pair of side walls at a position below the upper edges of the pair of side walls.

12. The console assembly of claim 11, wherein the platform wall includes a first platform portion, a second platform portion, and a third platform portion positioned between the first platform portion and the second platform portion, the third platform portion positioned below the first platform portion and the second platform portion.

13. The console assembly of claim 12, wherein a first pair of tabs extend outwardly from the first platform portion, each of the first pair of tabs are fixedly secured to the respective interior surface of each of the pair of side walls.

14. The console assembly of claim 12, wherein a second pair of tabs extend outwardly from the second platform portion, each of the second pair of tabs are fixedly secured to the respective interior surface of each of the pair of side walls.

15. The console assembly of claim 12, wherein the third platform portion is positioned closer to the lower edge of the pair of side walls than the first platform portion and the second platform portion.

16. The console assembly of claim 15, wherein the third platform portion is secured to the floor.

17. The console assembly of claim 16, wherein the first platform portion includes a front edge and a front wall that extends from the front edge of the first platform portion towards the lower edge of the pair of side walls.

18. The console assembly of claim 17, wherein each of the pair of side walls includes a front projection that extend inwardly from the interior surfaces of the pair of side walls, the front projection of each of the pair of side walls contacts the front wall of the first platform portion.

19. The console assembly of claim 16, wherein the second platform portion includes a rear edge opposite the front edge, the second platform portion includes a rear wall that extends from the rear edge of the second platform portion towards the lower edge of the pair of side walls.

20. The console assembly of claim 19, wherein each of the pair of side walls includes a rear projection that extend inwardly from the interior surfaces of the pair of side walls, the rear projection of each of the pair of side walls contacts the rear wall of the second platform portion.

\* \* \* \* \*